Nov. 30, 1965  G. C. WOOD  3,220,172
SIDE DELIVERY RAKES
Filed April 21, 1964  5 Sheets-Sheet 2
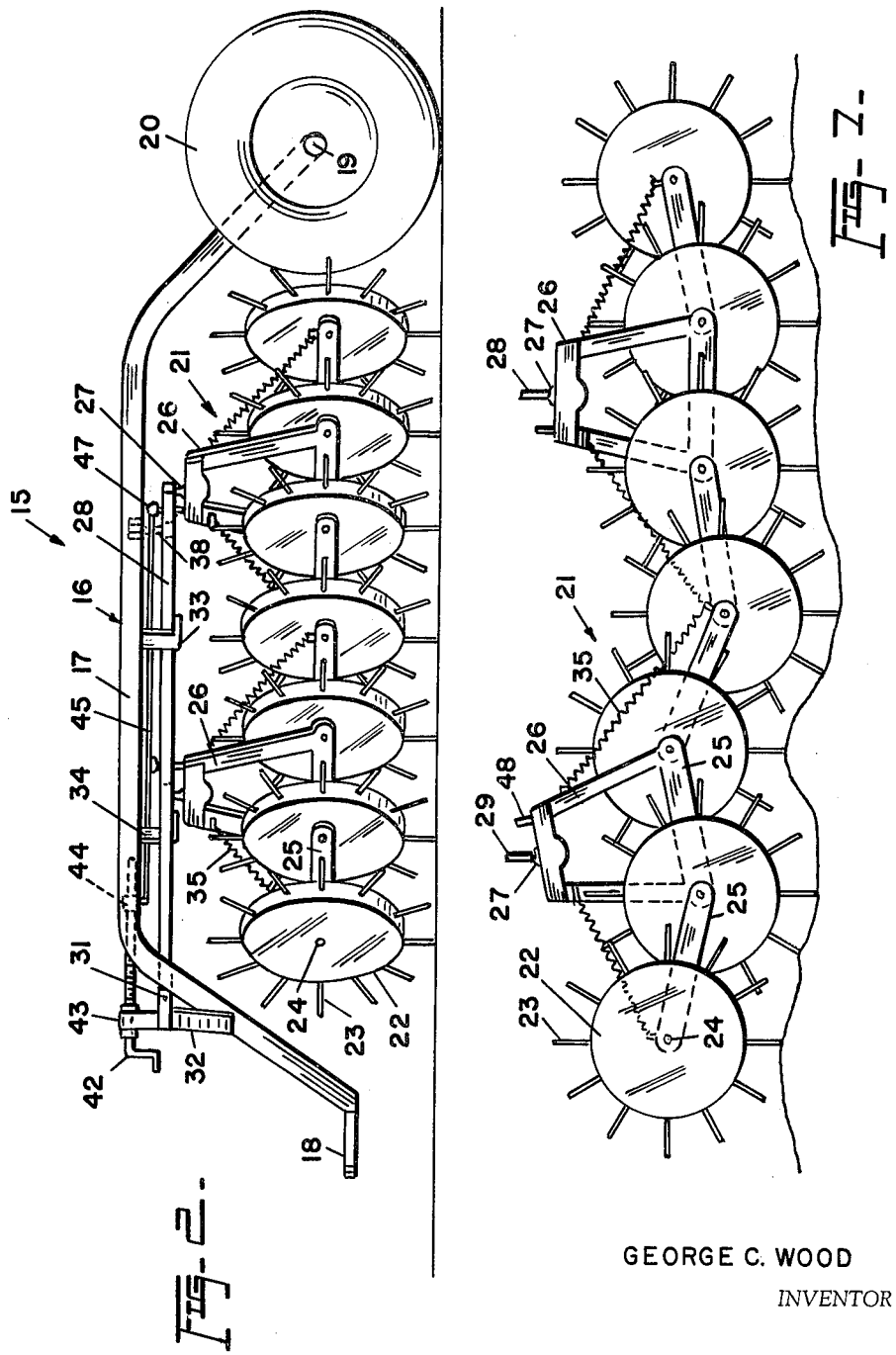
GEORGE C. WOOD
INVENTOR
BY  *Munson H. Lane*
ATTORNEY

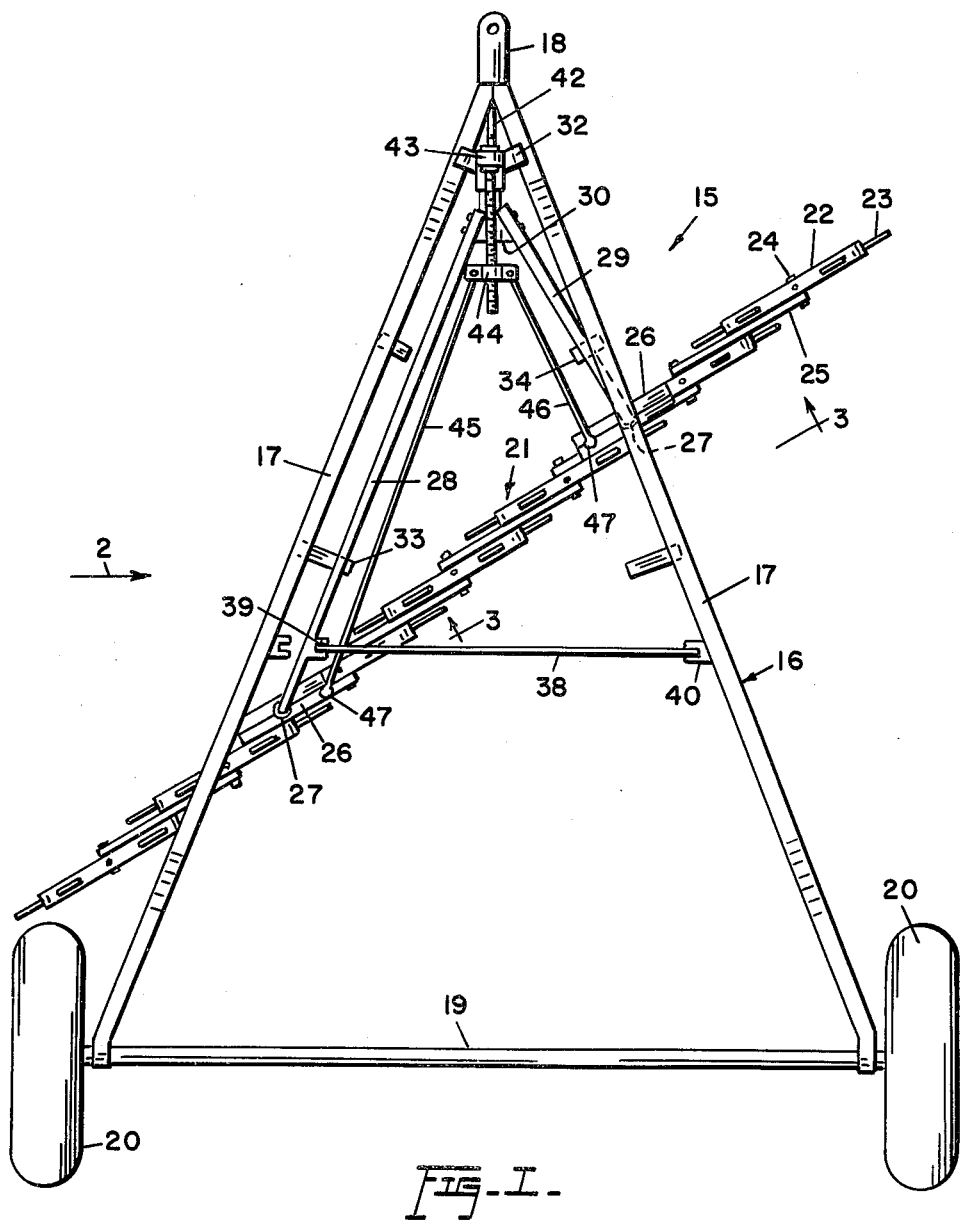

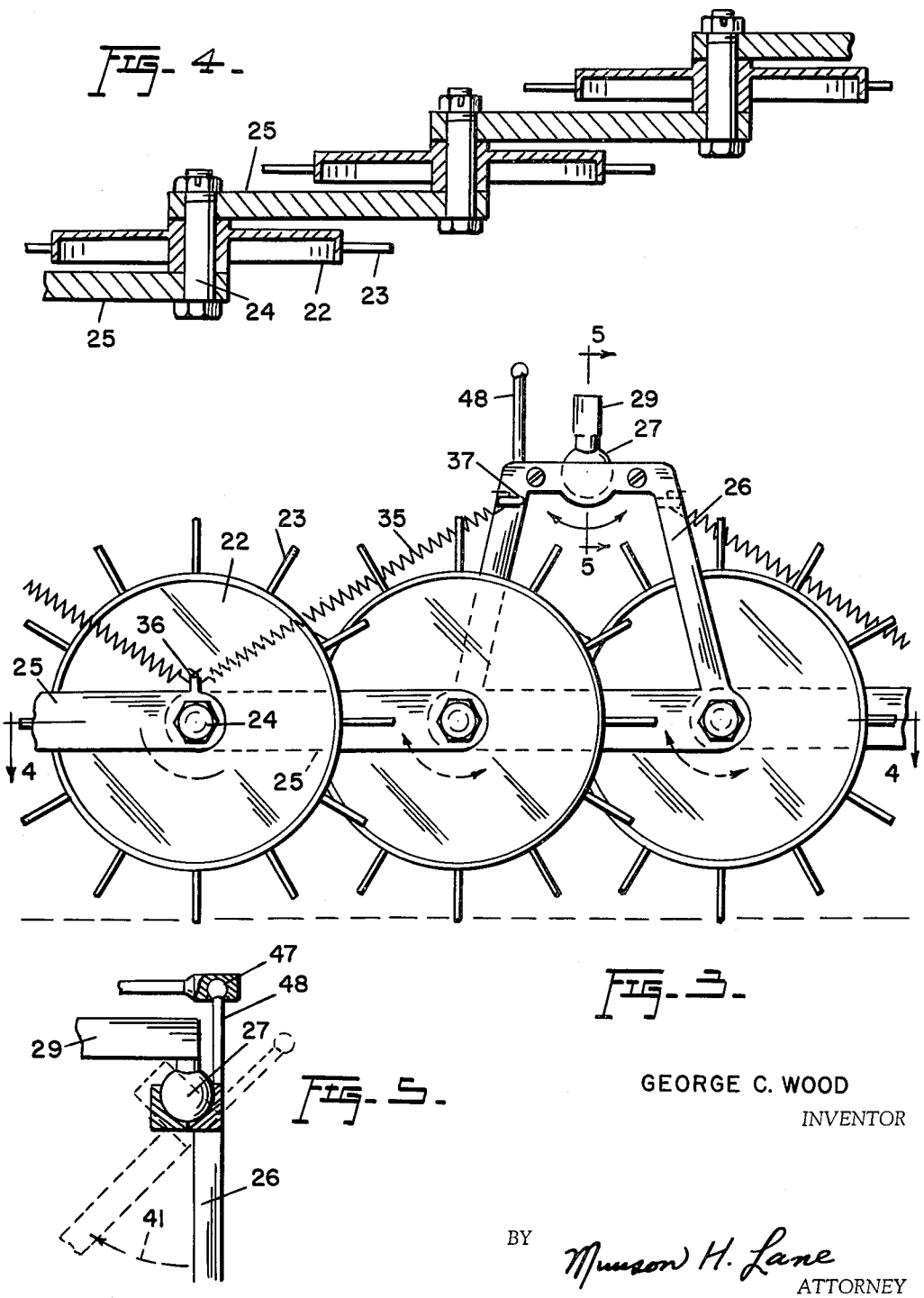

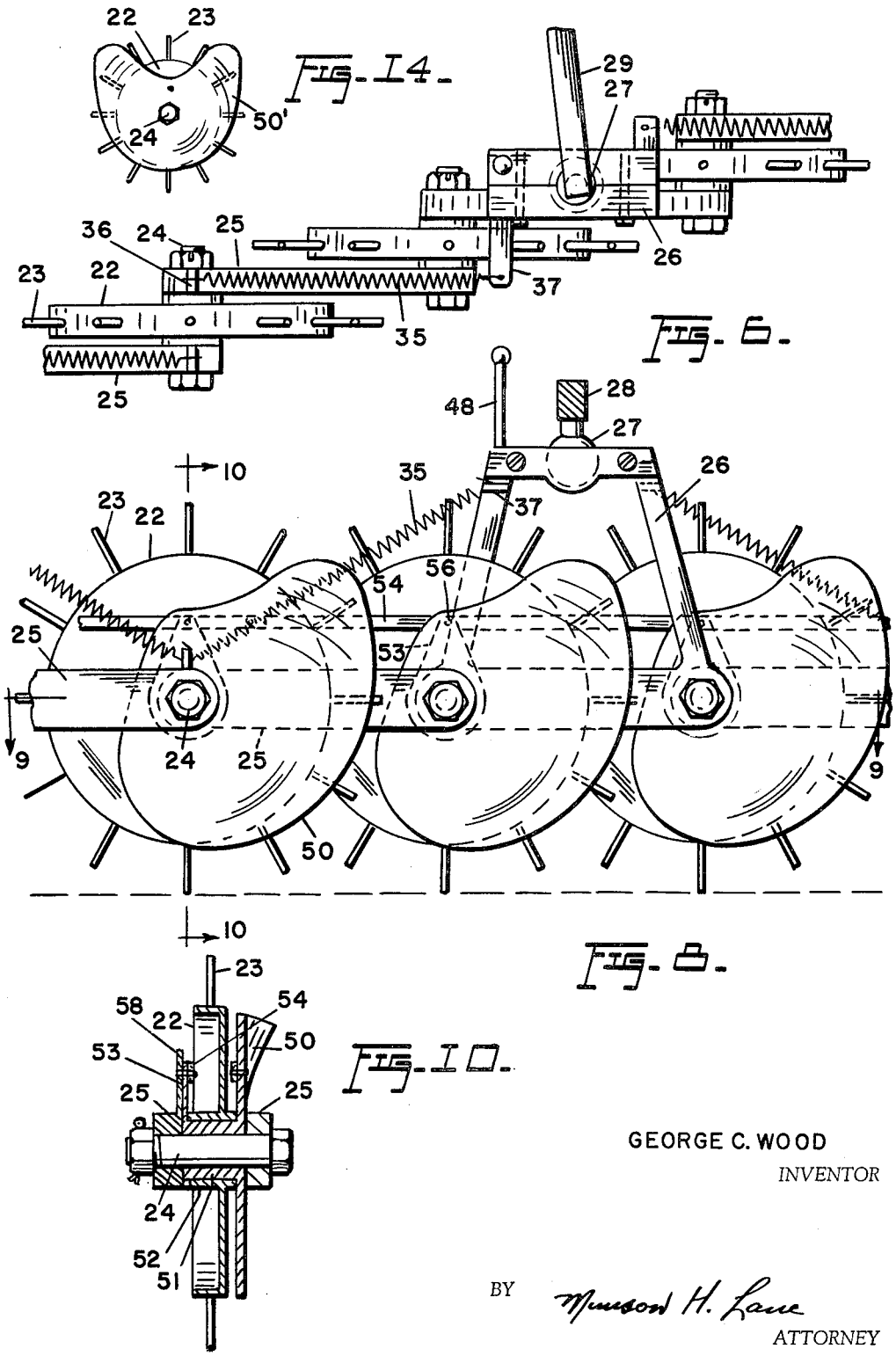

Nov. 30, 1965  G. C. WOOD  3,220,172
SIDE DELIVERY RAKES
Filed April 21, 1964  5 Sheets-Sheet 5
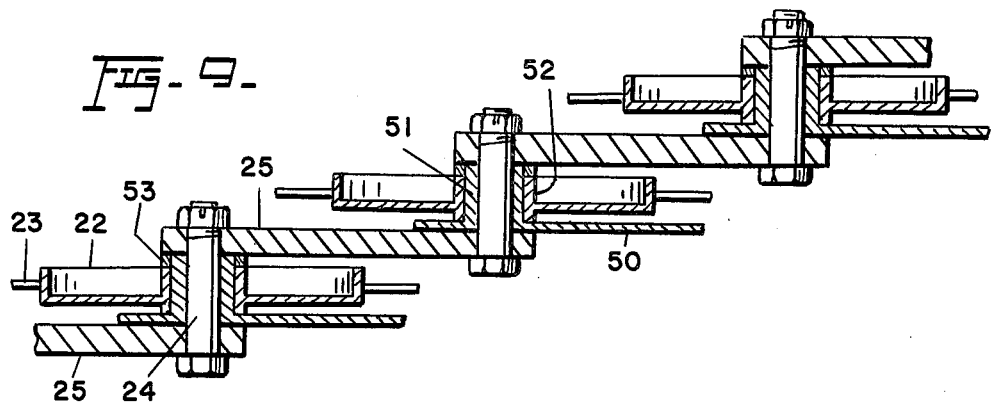
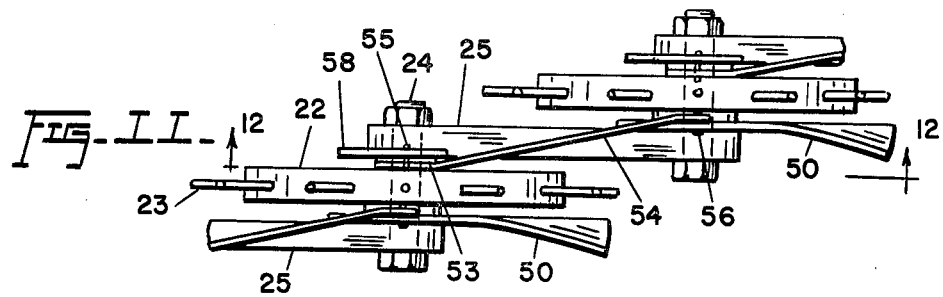
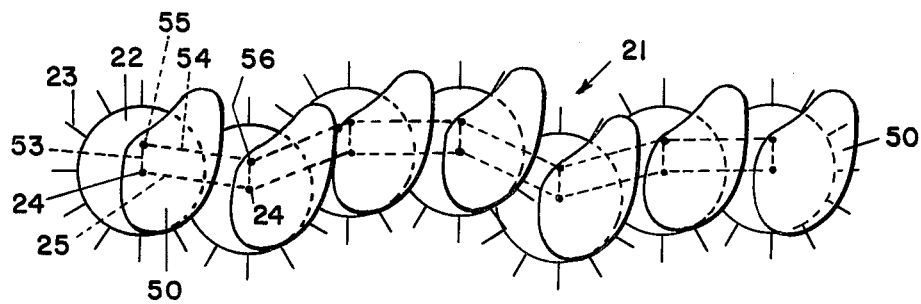
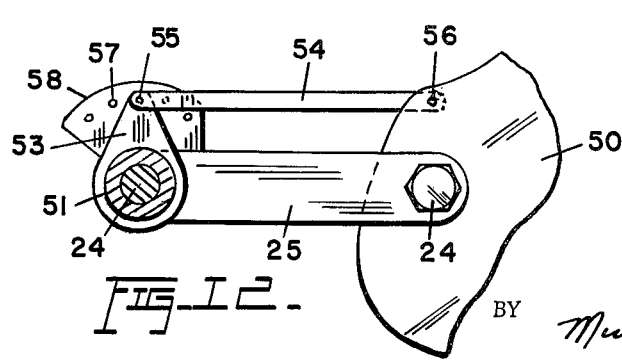
GEORGE C. WOOD
INVENTOR
BY Munson H. Lane
ATTORNEY

United States Patent Office 3,220,172
Patented Nov. 30, 1965

3,220,172
SIDE DELIVERY RAKES
George C. Wood, P.O. Box 448, Edenton, N.C.
Filed Apr. 21, 1964, Ser. No. 361,367
16 Claims. (Cl. 56—377)

This invention relates to new and useful improvements in agricultural implements, and in particular the invention concerns itself with an improved rake, utilizing a set of rotatable raking wheels supported by a wheeled frame such as may be drawn by a tractor, or the like.

The principal object of the invention is to facilitate convenient and efficient adjustment in the height of the raking wheels above the ground, as well as to permit raising of the wheels off the ground while turning corners or while the rake is being transported from one site of operation to another.

Another important object of the invention is to provide the raking wheels with adjustable shields or deflectors to vary their effectiveness in the performance of the raking operation.

Another important object of the invention resides in the provision of articulated means for mounting the raking wheels so that they are individually capable of raising and lowering movement for effective operation over uneven ground.

Another important object of the invention is to provide an improved rake wherein the aforementioned raking wheels, shields, wheel mountings and other related components are of what may be called a standardized construction, capable of mass production and expeditious replacement of one part by another, thus substantially reducing the volume of spare parts to be carried on hand by the user or distributor for servicing a rake of this type.

Another important object of the invention resides in the above mentioned standardized arrangement of its parts which permits the rake to be quickly and easily converted from left-hand to right-hand side delivery, or vice versa.

Other advantages of the invention reside in its simplicity of construction, efficient and dependable operation, and in its adaptability to economical manufacture.

With the foregoing more important objects and features in view and such other objects and features as may become apparent as this specification proceeds, the invention will be understood from the following description taken in conjunctions with the accompanying drawings, wherein like characters of reference are used to designate like parts, and wherein:

FIGURE 1 is a top plan view of the improved rake in accordance with the invention;

FIGURE 2 is a side elevational view thereof, taken in the direction of the arrow 2 in FIGURE 1;

FIGURE 3 is an enlarged fragmentary elevational view of the raking wheel assembly, taken substantially in the plane of the line 3—3 in FIGURE 1;

FIGURE 4 is a fragmentary horizontal sectional view, taken substantially in the plane of the line 4—4 in FIGURE 3;

FIGURE 5 is a fragmentary sectional detail, taken substantially in the plane of the line 5—5 in FIGURE 3;

FIGURE 6 is a fragmentary top plan view of the subject shown in FIGURE 3;

FIGURE 7 is an elevational view showing the raking wheel assembly of FIGURE 2 and illustrating the manner in which it is capable to adjust itself to uneven ground;

FIGURE 8 is a fragmentary view, similar to that shown in FIGURE 3, but including the raking wheel shields or deflectors;

FIGURE 9 is a fragmentary horizontal sectional view, taken substantially in the plane of the line 9—9 in FIGURE 8;

FIGURE 10 is a vertical sectional view, taken substantially in the plane of the line 10—10 in FIGURE 8;

FIGURE 11 is a fragmentary top plan view of the subject shown in FIGURE 8;

FIGURE 12 is a fragmentary vertical sectional detail, taken substantially in the plane of the line 12—12 in FIGURE 11;

FIGURE 13 is a diagrammatic illustration showing the relationship of the shields to the raking wheels when the wheels adjust themselves to uneven ground; and FIGURE 14 is an elevational view on a reduced scale, showing a modified embodiment of the shield in relation to its associated raking wheel.

Referring now to the accompanying drawings in detail, the improved rake in accordance with the invention is designated generally in FIGURES 1 and 2 by the reference numeral 15 and embodies in its construction a substantially V-shaped frame 16, consisting of a pair of rearwardly divergent side members 17, the convergent front ends of the side members having secured thereto a draft tongue 18, while the divergent rear ends thereof are connected by a transverse axle 19 on which a pair of travelling wheels 20 are rotatably mounted. As will be apparent from FIGURE 2, the front and rear end portions of the side members 17 are downturned so that their intermediate portions are raised substantially above the ground for accommodating thereunder the raking wheel assembly 21 now to be described.

The raking wheel assembly 21 comprises a plurality of individual raking wheels 22, each equipped with a set of radially projecting teeth or tines 23, the several raking wheels being mutually overlapped and disposed substantially in a row or plane which extends obliquely of the frame 16, as is best shown in FIGURE 1. The wheels 22 are rotatably mounted on stub shafts in the form of nut-equipped bolts 24, the latter being carried by connecting bars 25, extending from each wheel to the next adjacent wheel. Thus, the bars 25 provide an articulated connection between the several wheels, which permits the wheels to individually rise and fall when travelling over uneven ground, as is exemplified in FIGURES 7 and 13.

Two of the bars 25, spaced longitudinally of the assembly 21, are provided with upwardly projecting yokes 26, the upper portions of which are equipped with suitable sockets to accommodate swivel balls 27 at the rear ends of a pair of supporting arms 28, 29. The arms 28, 29 are forwardly convergent and are connected at their front ends to a yoke 30 (see FIGURE 1), which is pivoted as at 31 to a support bracket 32 (see FIGURE 2), secured to the front end portion of the frame 16, whereby the arms 28, 29 may swing vertically relative to the frame and thus floatingly support the raking wheel assembly 21 on the ground.

It will be apparent from the foregoing that by virtue of the vertically swingable arms 28, 29, the entire raking wheel assembly 21 may rise and fall relative to the frame 16, the lowering movement of the assembly being limited by stop brackets 33, 34 which are provided on the side members 17 of the frame and are engageable by the arms 28, 29 when the raking wheel assembly is lowered. It will be also apparent that apart from the raising and lowering movement of the wheel assembly as a whole, the individual wheels in the assembly may rise and fall due to the articulated arrangement of the connecting bars 25, so that the wheels accommodate themselves to uneven ground. The several wheels in the assembly are resiliently biased by tension springs 35 which are anchored at one end thereof to lugs 36 which are provided on all of the bars 25 except those equipped with the yokes 26. The yokes are provided with lugs 37 to which the other ends of the springs 35 are anchored, the arrangement of the springs in the raking wheel assembly is shown in FIGURE 7, in which it will be noted that the springs bias all of the connecting bars 25 and are either extended or contracted as the wheels in the assembly assume positions at different levels. While the springs bias the connecting bars 25 into substantial longitudinal alignment, they are resiliently yieldable so that the wheels 22 may become lowered by gravity if the contour of the ground so dictates.

The wheel assembly 21 is held against lateral shifting by a radius rod 38 which is pivoted at one end thereof as at 39 to the arm 28 and is pivoted at its other end as at 40 to a bracket provided on the frame 16.

With reference to FIGURE 5, it will be observed that the ball joints 27 which connect the yokes 26 to the arms 28, 29 permit the yokes to swing forwardly and upwardly as indicated by the arrow 41, so that the entire raking wheel assembly 21 may be raised clear off the ground while turning corners or while the rake is being transported from one site of operation to another. Raising and lowering of the wheel assembly may be effected by a hand crank 42 which is rotatably mounted in a bearing 43 on the bracket 32 and is screw-threaded to carry a traversing block 44. A pair of links 45, 46 are loosely connected at one end thereof to the block 44, while their other ends are connected by ball and socket joints 47 to upwardly projecting crank arms 48 which are rigidly secured to the yokes 26. Accordingly, when the hand crank 42 is rotated, the links 45, 46 will raise or lower the entire wheel assembly 21 in a pivotal manner afforded by the balls 27 acting as fulcrum means. It will be appreciated that the loose connection of the links 45, 46 to the block 44 permits the rear ends of these links to move upwardly and downwardly not only when the raking wheel assembly is raised or lowered as shown in FIG. 5, but also when the assembly including the arms 28, 29 moves upwardly and downwardly about the pivot 31.

The raking wheel assembly 21, extending obliquely of the frame 16, provides for side delivery of material being raked, for example, to the left side of the frame as viewed in FIGURE 1. However, the rake may be quickly and easily converted for right side delivery by simply orienting the wheel assembly obliquely to the opposite side of the frame, that is, to the right side instead of the left side as shown in FIGURE 1, and rearranging the connecting bars 25 and the wheels 22 in the assembly so that the leading wheel is foremost in overlap. The arms 28, 29, the radius rod 38 and the links 45, 46 are transferred to opposite sides of the frame, it being noted that the stop brackets 33, 34 and the radius arm bracket 40 are duplicated on the two frame side members 17 so that the arms, links and radius rod may be reversely positioned as already explained.

FIGURES 6, 8, 9, 10, 11 and 12 illustrate the raking wheel assembly which is the same as the assembly 21 but the wheels 22 thereof are provided with shields or deflectors 50 for controlling the amount of material being raked by the wheels and assisting in transfer of such material from one wheel to the next. The shields 50 are provided with tubular hubs 51 which are rotatably positioned on the stub shafts 24 and the wheels 22 have the hubs 52 thereof rotatably positioned on the hubs 51 of the shields.

Suitably secured to the hub 51 of each shield is a crank piece 53 and a link 54 is pivoted at one end thereof to the crank piece as at 55, while its other end is pivoted as at 56 to the shield 50 of the next adjacent wheel. The links 54 and the bars 25 coact with the shields 50 and with the crank piece 53 to provide parallelogram linkage, so that even when the raking wheel assembly conforms to uneven ground as shown in FIGURE 13, the positional relationship or orientation of the several shields in the set remains unchanged.

However, the position of the shields with respect to the wheels may be varied by turning the hubs 51 on the shafts 24 and the shields may be locked in a selected position by passing the pivots 55 through selected apertures 57 in sector plates 58 which are secured to the bars 25 adjacent the crank pieces 53, as is best shown in FIGURE 12.

FIGURE 14 shows a modified embodiment of the shields, designated 50', which is large enough to extend over both sides of the wheel 22 rather than only over one side, as does the shield 50. The shields 50' may be used selectively for left-hand and right-hand side delivery, so that the use of separate left-hand and right-hand shields is not necessary.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a rake, the combination of a wheeled frame, a raking wheel assembly supported by said frame and including a plurality of rotatable raking wheels, means movably connecting said assembly to said frame whereby the assembly may be bodily raised and lowered relative to the frame, said raking wheel assembly also including a set of substantially longitudinally aligned connecting bars and a set of stub shafts connecting said bars together in end to end relation whereby said assembly is articulated, said wheels being rotatably mounted on said stub shafts and capable of individual rising and lowering movement in the articulated assembly to compensate for uneven ground.

2. The device as defined in claim 1 together with resilient means connected to said bars and biasing the same into substantial longitudinal alignment.

3. The device as defined in claim 1 together with means for raising and lowering said raking wheel assembly independently of movement of said connecting means.

4. In a rake, the combination of a wheeled frame, and a raking wheel assembly supported by said frame, said assembly including a set of substantially longitudinally aligned connecting bars, a set of stub shafts connecting said bars together in end to end relation whereby the assembly is articulated, and a set of raking wheels rotatably mounted on said stub shafts, said wheels being capable of individual raising and lowering movement in the articulated assembly to compensate for uneven ground.

5. The device as defined in claim 4 together with resilient means connected to said bars and biasing the same into substantial longitudinal alignment.

6. The device as defined in claim 5 together with a set of deflector shields mounted on said stub shafts forwardly of the respective raking wheels, and linkage operatively connecting said shields together.

7. In a rake, the combination of a wheeled frame, and a raking wheel assembly supported by said frame, said assembly including a set of connecting bars, a set of stub shafts connecting said bars together whereby the assembly is articulated, a set of raking wheels rotatably mounted on said stub shafts, said wheels being capable of individual rising and falling movement in the articulated assembly to compensate for uneven ground, resilient means connected to said bars and biasing the same into substantial longitudinal alignment, a set of deflector shields rotatably mounted on said stub shafts forwardly of the respective raking wheels, and linkage operatively connecting said shields together and maintaining the shields in a fixed positional relation with respect to each other notwithstanding rising and lowering movement of the individual wheels.

8. The device as defined in claim 7 wherein said linkage is adjustable to vary the relationship of said shields to said wheels, and means for locking the linkage in an adjusted position.

9. In a rake, the combination of a wheeled frame, arms pivoted to said frame for raising and lowering movement, a raking wheel assembly connected to said arms and including a plurality of rotatable raking wheels, stops provided on said frame and engageable by said arms to limit the lowering of said assembly relative to the frame, said assembly also including a set of connecting bars and a set of stub shafts pivotally connecting said bars together whereby the assembly is articulated, said wheels being rotatably mounted on said stub shafts and capable of individual raising and lowering movement in the articulated assembly to compensate for uneven ground, a set of deflector shields rotatably mounted on said stub shafts forwardly of the respective raking wheels, and linkage operatively connecting said shields together and maintaining the shields in a fixed positional relation with respect to each other notwithstanding raising and lowering of the individual wheels.

10. The device as defined in claim 9 wherein said linkage is adjustable to vary the relationship of said shields to said wheels, and means for locking the linkage in an adjusted position.

11. The device as defined in claim 9 together with means movably connecting said raking wheel assembly to said arms for raising and lowering of the assembly independently of raising and lowering of the arms, and means for raising and lowering said assembly relative to the arms.

12. The device as defined in claim 9 together with yokes provided on certain of said connecting bars and movably connected to said arms.

13. The device as defined in claim 12 together with resilient means connected to said bars and to said yokes for biasing the bars into substantial longitudinal alignment.

14. In an articulated raking wheel assembly, the combination of a set of connecting bars, a set of stub shafts connecting said bars together, a set of raking wheels rotatably mounted on said stub shafts, said wheels being capable of individual raising and lowering movement to compensate for uneven ground, a set of deflector shields rotatably mounted on said stub shafts adjacent the respective raking wheels, and linkage operatively connecting said shields together and maintaining the same in a fixed positional relation to each other notwithstanding raising and lowering movement of the individual wheels.

15. The device as defined in claim 14 wherein said linkage is adjustable to vary the relationship of said shields to said wheels, and means for locking the linkage in an adjusted position.

16. The device as defined in claim 14 together with resilient means connected to said bars and biasing the same into substantial longitudinal alignment.

References Cited by the Examiner
UNITED STATES PATENTS

| | | | |
|---|---|---|---|
| 2,727,351 | 12/1955 | Plant | 56—377 |
| 2,796,723 | 6/1957 | Smith et al. | 56—377 |
| 2,811,009 | 10/1957 | Plant | 56—377 |
| 2,845,769 | 8/1958 | Hintz et al. | 56—377 X |
| 2,922,271 | 1/1960 | Van der Lely et al. | 56—377 |
| 2,991,613 | 7/1961 | Breed | 56—377 |
| 2,993,325 | 7/1961 | Van der Lely | 56—377 |

ANTONIO F. GUIDA, *Acting Primary Examiner.*

RUSSELL R. KINSEY, *Examiner.*